United States Patent
Liu et al.

(10) Patent No.: US 9,779,513 B2
(45) Date of Patent: Oct. 3, 2017

(54) IMAGE PROCESSING DEVICE, IMAGE PROCESSING METHOD, AND IMAGE PROCESSING PROGRAM

(71) Applicant: Rakuten, Inc., Tokyo (JP)

(72) Inventors: Xinhao Liu, Tokyo (JP); Naoki Chiba, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 0 days.

(21) Appl. No.: 14/766,168

(22) PCT Filed: Mar. 13, 2013

(86) PCT No.: PCT/JP2013/057001
§ 371 (c)(1),
(2) Date: Aug. 6, 2015

(87) PCT Pub. No.: WO2014/141404
PCT Pub. Date: Sep. 18, 2014

(65) Prior Publication Data
US 2015/0371404 A1    Dec. 24, 2015

(51) Int. Cl.
G06K 9/00    (2006.01)
G06T 7/40    (2017.01)
G06K 9/34    (2006.01)
G06K 9/38    (2006.01)
G06T 7/44    (2017.01)

(52) U.S. Cl.
CPC .............. *G06T 7/403* (2013.01); *G06K 9/34* (2013.01); *G06K 9/38* (2013.01); *G06T 7/44* (2017.01)

(58) Field of Classification Search
None
See application file for complete search history.

(56) References Cited

U.S. PATENT DOCUMENTS

| 6,466,693 B1* | 10/2002 | Otsu ................... G06K 9/38 358/466 |
| 2002/0031263 A1 | 3/2002 | Yamakawa |
| 2007/0172137 A1 | 7/2007 | Mori |
| 2011/0317924 A1 | 12/2011 | Fukushi et al. |
| 2014/0301649 A1* | 10/2014 | Zhang ............... G06T 7/0002 382/199 |

FOREIGN PATENT DOCUMENTS

| JP | 2001-268383 A | 9/2001 |
| JP | 2004-235743 A | 8/2004 |
| JP | 2007-74091 A | 3/2007 |
| JP | 2007-193750 A | 8/2007 |
| JP | 2012-8100 A | 1/2012 |
| JP | 2013-30090 A | 2/2013 |

OTHER PUBLICATIONS

Communication dated Sep. 24, 2015 issued by the International Searching Authority in counterpart International Application No. PCT/JP2013/057001.

* cited by examiner

*Primary Examiner* — Hadi Akhavannik
(74) *Attorney, Agent, or Firm* — Sughrue Mion, PLLC (57) ABSTRACT

An image processing device according to one embodiment includes a calculation unit and a setting unit. The calculation unit calculates a degree of complexity indicating a degree of positional dispersion of edges in a target region where a text region is to be extracted. The setting unit sets an edge threshold for detecting the text region to low as the degree of complexity is low.

11 Claims, 10 Drawing Sheets

IMAGE PROCESSING DEVICE, IMAGE PROCESSING METHOD, AND IMAGE PROCESSING PROGRAM

CROSS REFERENCE TO RELATED APPLICATIONS

This application is a National Stage of International Application No. PCT/JP2013/057001filed Mar. 13, 2013, the contents of all of which are incorporated herein by reference in their entirety.

TECHNICAL FIELD

One aspect of the present invention relates to an image processing device, an image processing method, and an image processing program.

BACKGROUND ART

In order to specify a text region in which text is drawn, there is a technique that specifies the boundary (edge) between the text region and another region. For example, the image processing device disclosed in Patent Literature 1 below calculates an edge component index value indicating the amount of edge component contained in each segmented region, compares the edge component index value with a threshold and thereby determines whether there is an object to be detected in each segmented region.

CITATION LIST

Patent Literature

PTL 1: JP 2012-008100 A

SUMMARY OF INVENTION

Technical Problem

In the technique according to the related art, because the threshold that is used for edge detection is set to a fixed value by a rule of thumb or the like, it is sometimes difficult to specify a text region accurately depending on the way text is drawn in the text region. For example, there is a case where a text region where the contrast with a background region is low, such as translucent text, cannot be detected accurately. One way to solve this drawback is to uniformly reduce the threshold for edge detection; however, this causes detection of an unnecessary edge, which is different from the edge of a text region to be detected, in some images. In view of the above, it is desirable to more reliably detect a text detection to be detected in accordance with images.

Solution to Problem

An image processing device according to one aspect of the present invention includes a calculation unit configured to calculate a degree of complexity indicating a degree of positional dispersion of edges in a target region where a text region is to be extracted, and a setting unit configured to set an edge threshold for detecting the text region in the target region to low as the degree of complexity is low.

An image processing method according to one aspect of the present invention is an image processing method performed by an image processing device, the method including a calculation step of calculating a degree of complexity indicating a degree of positional dispersion of edges in a target region where a text region is to be extracted, and a setting unit configured to a setting step of setting an edge threshold for detecting the text region in the target region to low as the degree of complexity is low.

An image processing program according to one aspect of the present invention causes a computer to implement a calculation unit configured to calculate a degree of complexity indicating a degree of positional dispersion of edges in a target region where a text region is to be extracted, and a setting unit configured to set an edge threshold for detecting the text region in the target region to low as the degree of complexity is low.

A computer-readable recording medium according to one aspect of the present invention stores an image processing program that causes a computer to implement a calculation unit configured to calculate a degree of complexity indicating a degree of positional dispersion of edges in a target region where a text region is to be extracted, and a setting unit configured to set an edge threshold for detecting the text region in the target region to low as the degree of complexity is low.

According to the above aspects, the degree of complexity indicating the degree of positional dispersion of edges is calculated for a target region, and the edge threshold is set to a lower value as the degree of complexity is lower. In this manner, by setting the edge threshold dynamically according to the degree of complexity, it is possible to detect the edge in accordance with the characteristics of a target region and, as a result, it is possible to detect a text region more reliably.

In the image processing device according to another aspect, the calculation unit may divide an original image into a plurality of patches, calculate a texture strength indicating a degree of variation in the amount of change in pixel value in the patch for each patch, and calculate the degree of complexity of the target region composed of one or more patches based on the texture strength of each patch.

In the image processing device according to another aspect, the target region may be the whole of the original image, and the calculation unit may calculate the degree of complexity of the target region based on the texture strength of each patch.

In the image processing device according to another aspect, the calculation unit may group a plurality of patches having the texture strength within a specified range and arranged continuously together, sets each group as the target region, and calculate the degree of complexity of each target region.

In the image processing device according to another aspect, the calculation unit may evenly divide the original image to generate a plurality of divided regions including a plurality of patches as the target region, and calculate the degree of complexity of each divided region based on the degree of complexity of each patch.

In the image processing device according to another aspect, the calculation unit may obtain the degree of complexity of the target region by dividing the number of patches where the texture strength is equal to or higher than a specified value in the target region by the total number of patches in the target region.

In the image processing device according to another aspect, the calculation unit may obtain the degree of complexity of the target region by dividing an average value of the texture strengths of the patches where the texture strength is equal to or higher than a specified value in the target region by a predetermined maximum value of the texture strength.

In the image processing device according to another aspect, the target region may be the patch, and the calculation unit may calculate the degree of complexity of each target region based on the corresponding texture strength.

In the image processing device according to another aspect, the calculation unit may obtain the degree of complexity of the target region by dividing the texture strength in the target region by a predetermined maximum value of the texture strength.

Advantageous Effects of Invention

According to one aspect of the present invention, it is possible to more reliably detect a text detection to be detected in accordance with images.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

The functions and configuration of an image processing device 10 according to an embodiment are described hereinafter with reference to FIGS. 1 to 8. The image processing device 10 is a computer system that detects an edge, which is the outline of text superimposed on an image. Note that "text" in this specification is the concept including a mark, a figure or the like of a certain shape.

Images in which text is superimposed on pictures are seen in various scenes. For example, in a virtual shopping mall that sells a large variety of products, images in which text is superimposed on product pictures are often used as product images. When drawing text in an image, in not a few cases, text with low contrast, such as translucent text or text in the color close to the background color, is used in terms of design. In this specification, an image in which text is drawn is referred to also as "text image".

On the other hand, in the processing such as the Canny method that specifies the edge of text from a text image, it is necessary to set a threshold (edge threshold) for specifying the edge. However, because there are various ways text is drawn, if one fixed value is used as the edge threshold, while the edge of text can be appropriately specified for some images, it cannot be appropriately specified for other images in some cases.

Figure 1:
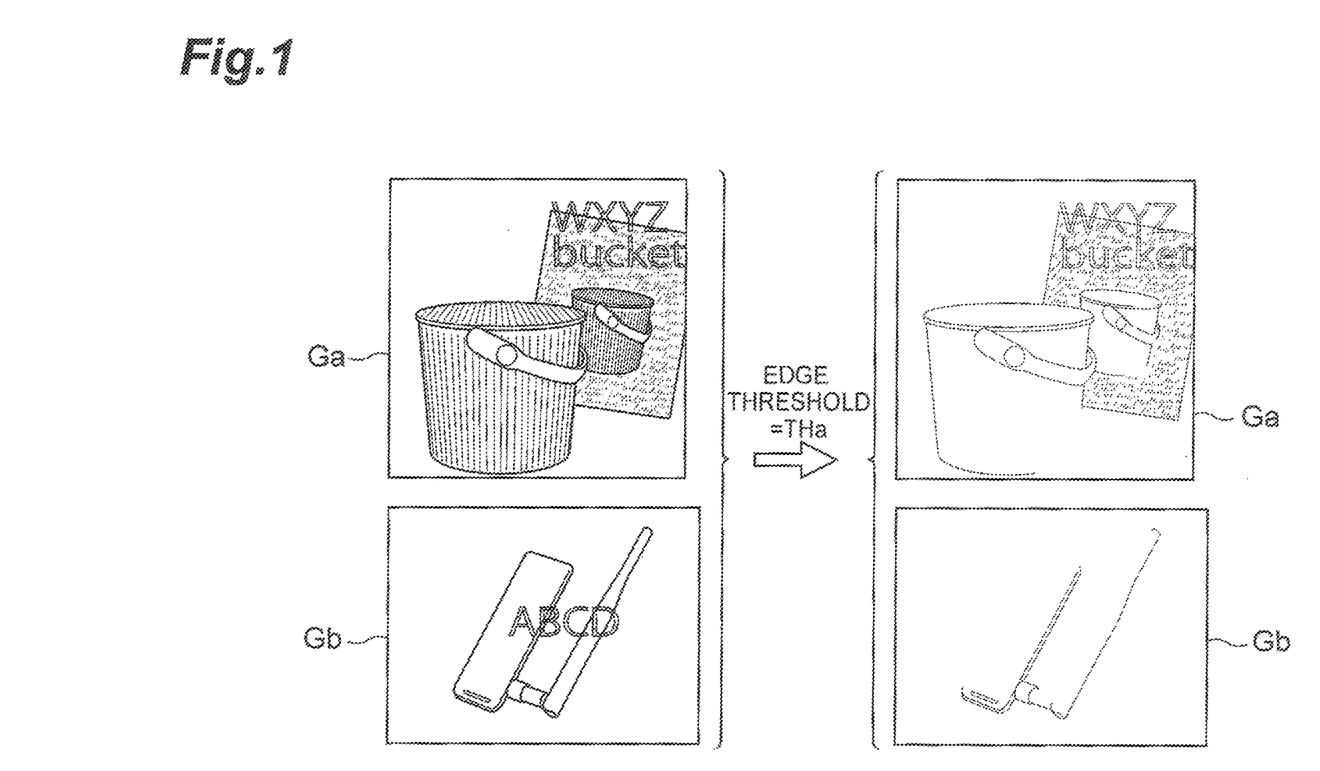
FIG. 1 is a view showing the concept of edge extraction according to related art.

As one example, consider the processing of extracting the edge from each of two text images Ga and Gb shown in FIG. 1. The image Ga is an image in which the two letter strings "WXYZ" and "bucket" in the same darkness are superimposed on the picture of a bucket placed on a lawn. The image Gb is an image in which the letter string "ABCD" is superimposed on the picture of a communication module. The transparency of the letter string "ABCD" is higher than that of the letter strings "WXYZ" and "bucket", and therefore "WXYZ" and "bucket" are darker than "ABCD".

It is necessary to set the edge threshold to high in order to appropriately specify the edge of "WXYZ" and "bucket" that are drawn in the image Ga. When the edge threshold is THa, "WXYZ" and "bucket" in the image Ga can be clearly specified as shown in FIG. 1. However, when the edge threshold THa is applied to the processing of the image Gb, because the transparency of the letter string "ABCD" is high, the edge of the letter string cannot be extracted as shown in FIG. 1 in some cases.

Figure 2:
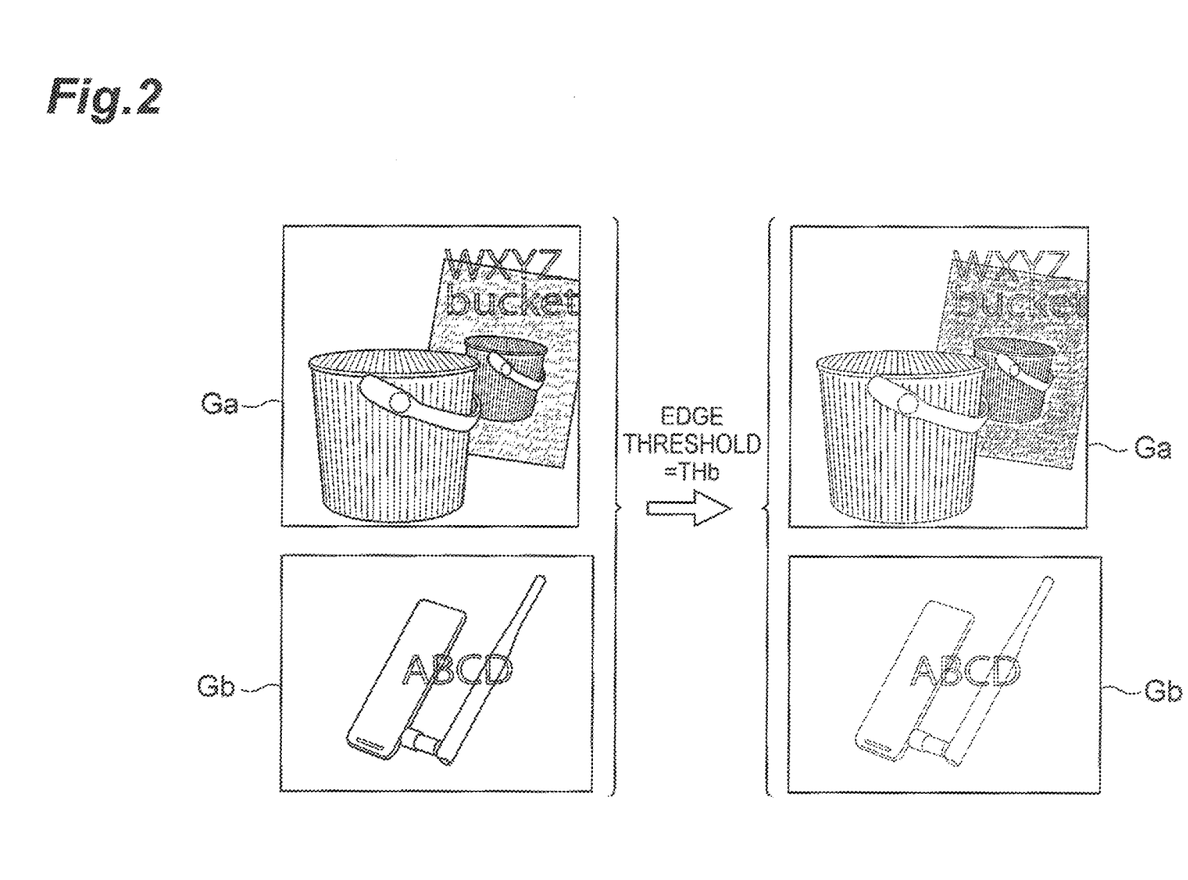
FIG. 2 is a view showing the concept of edge extraction according to related art.

In order to appropriately specify the edge of "ABCD" that is drawn in the image Gb, it is necessary to set the edge threshold to a value THb that is lower than THa as shown in FIG. 2. However, when the edge threshold THb is applied to the processing of the image Ga, not only the two letter strings but also the edges of the lawn and the bucket are extracted and intersect or ovelap with the edges of the letter strings. It is thus not possible to correctly extract the text "WXYZ" and "bucket".

Figure 3:
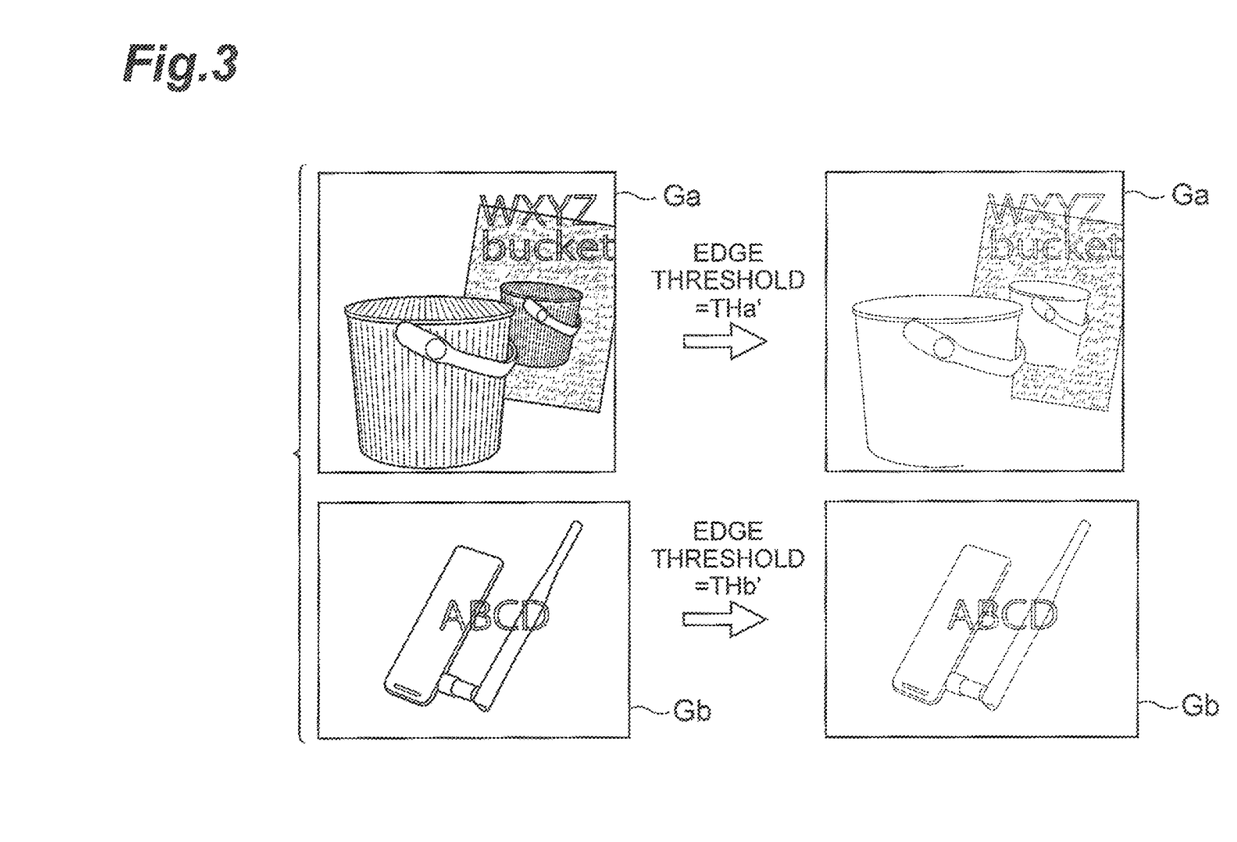
FIG. 3 is a view showing the concept of edge extraction according to an embodiment.

In order to appropriately specify the edge of each text drawn in different levels of contrast in different images, the image processing device 10 determines the edge threshold dynamically for each image. According to this embodiment, a high threshold THa' is set for the image Ga, and a lower threshold THb' (i.e. THa'>THb') is set for the image Gb as shown in FIG. 3, and it is thereby possible to correctly extract the edge of text in both of the two images Ga and Gb.

Figure 4:
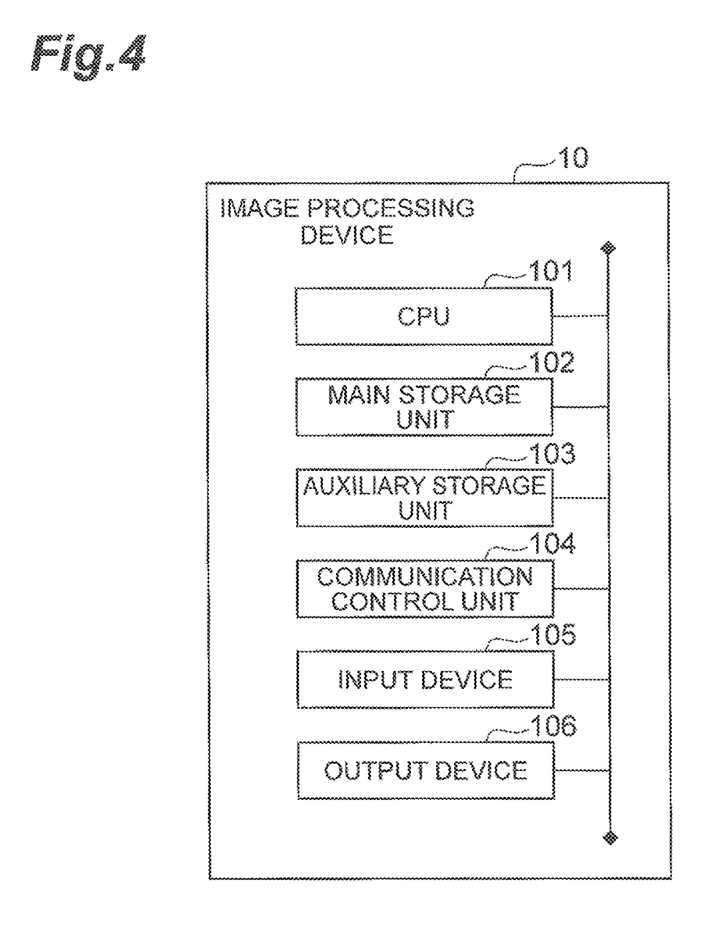
FIG. 4 is a view showing a hardware configuration of an image processing device according to the embodiment.

FIG. 4 shows a hardware configuration of the image processing device 10. The image processing device 10 includes a CPU 101 that executes an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse, and an output device 106 such as a display.

The functional elements of the image processing device 10, which are described later, are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and databases required for processing are stored in the main storage unit 102 or the auxiliary storage unit 103.

Note that the image processing device 10 may be composed of one computer or may be composed of a plurality of computers.

Figure 5:
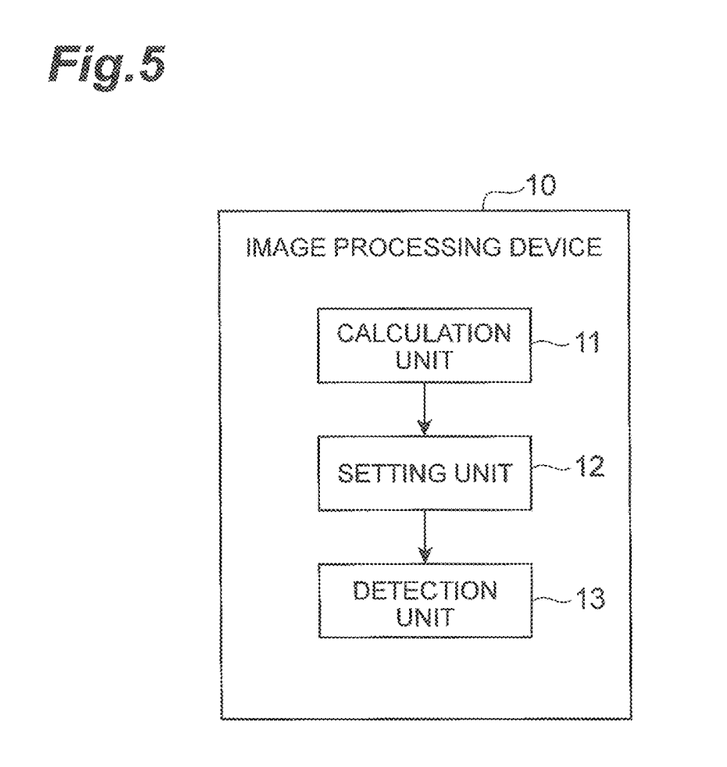
FIG. 5 is a block diagram showing a functional configuration of the image processing device according to the embodiment.

As shown in FIG. 5, the image processing device 10 includes, as functional elements, a calculation unit 11, a setting unit 12, and a detection unit 13.

The calculation unit 11 is a functional element that calculates the degree of complexity in a target region where a text region is to be extracted.

Figure 6:
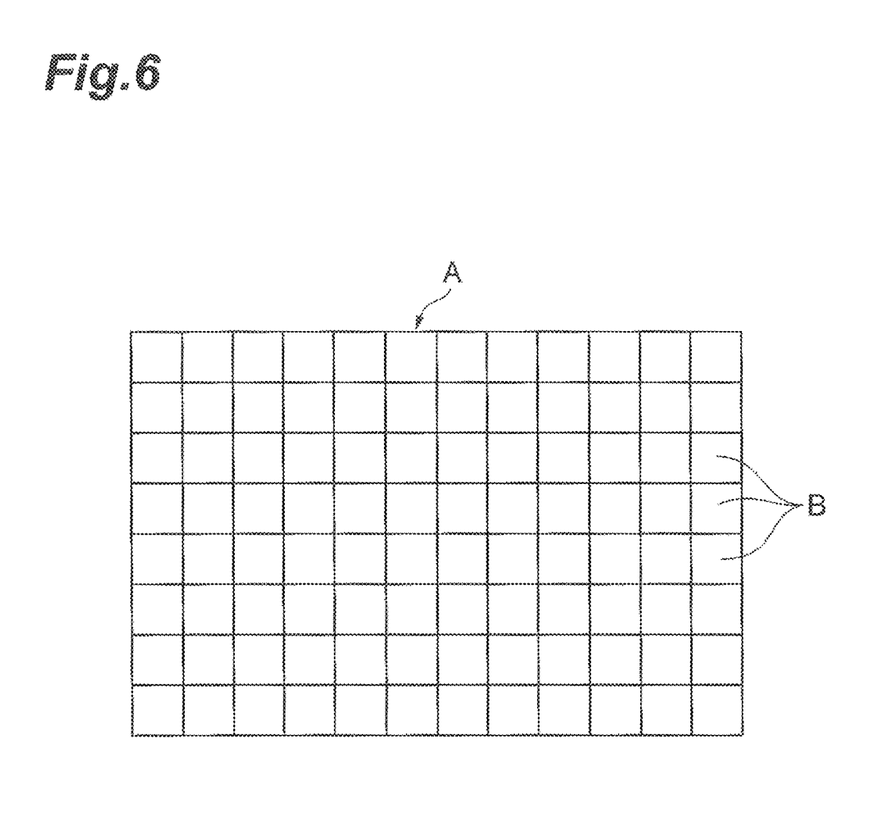
FIG. 6 is a view showing an example of dividing an original image into a plurality of patches.

First, the calculation unit 11 receives data A of one original image and divides the original image data A into a plurality of patches B as shown in FIG. 6. Although the size of one patch is 7 pixels by 7 pixels in this embodiment, the size of the patch is not limited thereto and may be set arbitrarily.

Next, the calculation unit 11 calculates a texture strength indicating the degree of variation (variance) in the amount of change in pixel value for each of a plurality of patches. In the image region (for example, the lawn region in the image Ga) with the large variation in the amount of change, the position of the color (edge) is dispersed. The amount of change in pixel value is a gradient between two adjacent pixels, and it can be obtained for each of the horizontal direction and the vertical direction of a patch.

The calculation unit 11 calculates a gradient matrix G for a patch $w_i$ composed of a plurality of pixels by the following equation (1), $$G = \begin{bmatrix} \vdots & \vdots \\ p_x(k) & p_y(k) \\ \vdots & \vdots \end{bmatrix}, k \in w_i \quad (1)$$

where $[p_x(k), p_y(k)]^T$ indicates a gradient in a pixel $(x_k, y_k)$, and T indicates a transposed matrix.

Then, the calculation unit 11 calculates a gradient covariance matrix C by the following equation (2). T indicates a transposed matrix.

$$C = G^T G \quad (2)$$

Main information about the patch $w_i$ can be derived from the gradient matrix G and the gradient covariance matrix C.

After that, the calculation unit 11 calculates a local dominant direction in a patch and energy in the direction by using an eigenvector and an eigenvalue of the gradient covariance matrix C.

Eigen decomposition performed by the calculation unit 11 is represented by the following equations (3) and (4). First, the gradient matrix G is represented by the following equation (3).

$$G = USV^T = U \begin{bmatrix} s_1 & 0 \\ 0 & s_2 \end{bmatrix} [v_1 v_2]^T \quad (3)$$

where U and V are orthonormal matrices. $v_1$ is a column vector indicating the dominant direction. $v_2$ is a column vector orthogonal to the column vector $v_1$, indicating the edge direction. $s_1$ indicates energy in the dominant direction, and $s_2$ indicates energy in the edge direction.

Accordingly, the gradient covariance matrix C is represented by the following equation (4).

$$C = VS^T SV^T = V \begin{bmatrix} s_1^2 & 0 \\ 0 & s_2^2 \end{bmatrix} V^T \quad (4)$$

Figure 7:
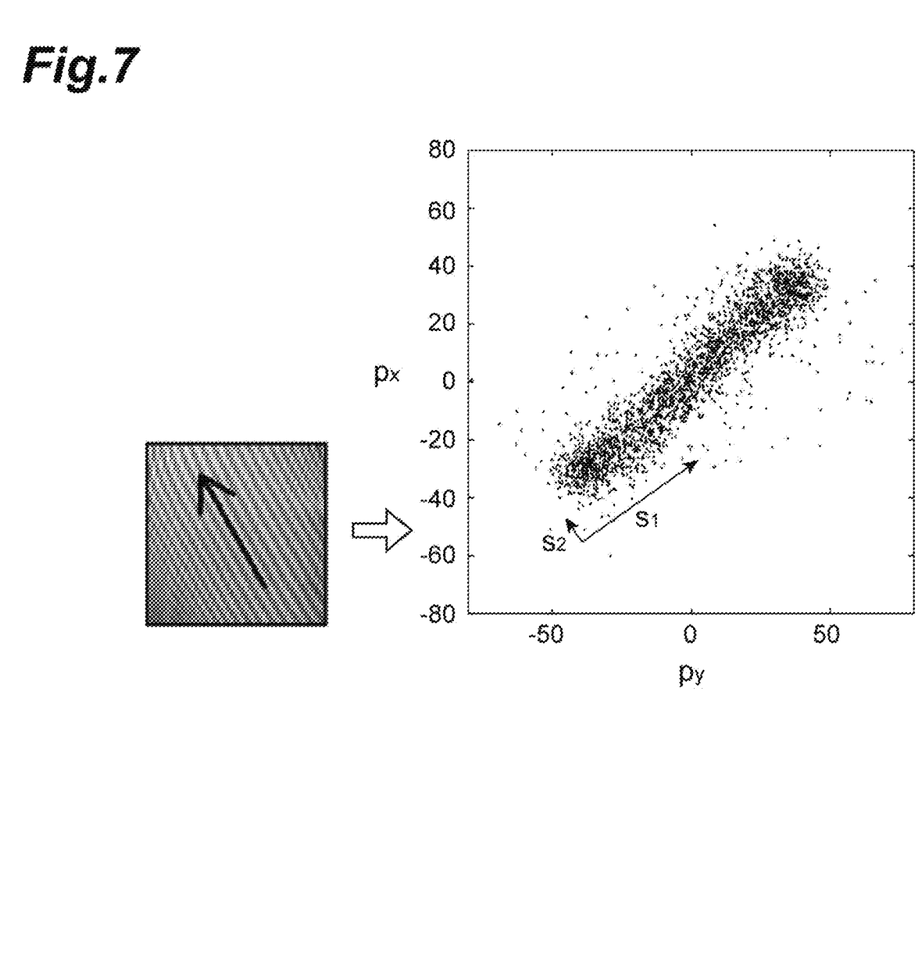
FIG. 7 is a view showing an example of eigen decomposition.

FIG. 7 shows an example of eigen decomposition. $s_1$ in this view indicates energy in the dominant direction, and $s_2$ indicates energy in the edge direction. In the example of FIG. 7, the edge direction is defined in the direction along the striped pattern (see the arrow in the image).

Then, the calculation unit 11 calculates a trace, which is the sum of eigenvalues in the gradient covariance matrix C, as a texture strength $\xi$ of the patch. "tr( )" in the following equation (5) is an operator indicating the trace.

$$\xi = \text{tr}(C) \quad (5)$$

Figure 8:
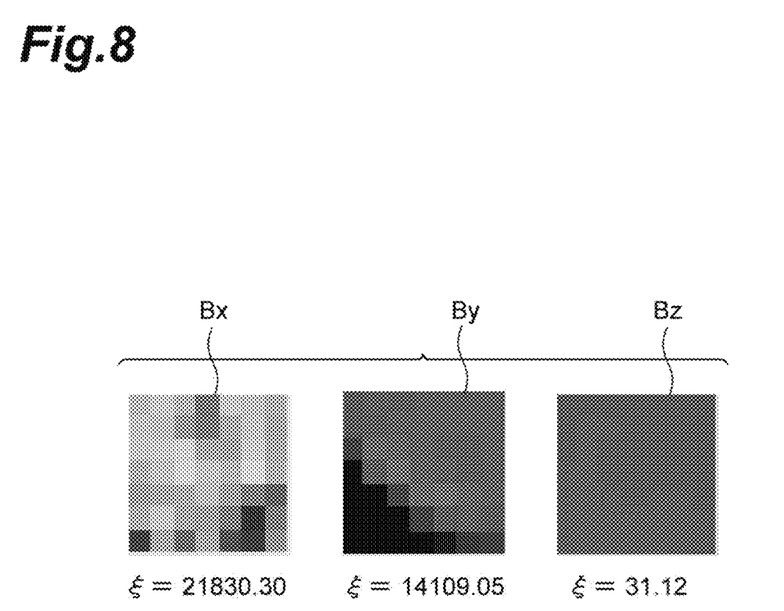
FIG. 8 is a view showing examples of texture strengths.

The texture strength $\xi$ is described with reference to FIG. 8 for easier understanding. FIG. 8 shows an example of three patches Bx, By and Bz represented in a gray scale and the texture strength $\xi$ of each patch. When the pixel values are substantially uniform as in the patch Bz, the texture strength is significantly low, and when the pixel values in a patch are all the same, the texture strength is 0. On the other hand, when the color becomes darker (or lighter) linearly as in the patch By, the texture strength is higher. Further, when the pixel values are all different (when the position of the edge is dispersed) as in the patch Bx, the texture strength is even higher. In this manner, the texture strength indicates the degree of positional dispersion of edges in the patch.

The calculation unit 11 performs the processing including the calculation of the above equations (1) to (5) for each patch and thereby calculates the texture strength of each patch.

After that, the calculation unit 11 calculates the degree of complexity in the target region where a text region is to be detected by using one edge threshold. The range of the target region and the calculation method of the degree of complexity are not particularly limited, and various methods can be used as follows.

[Method of setting the whole original image as one target region] The calculation unit 11 may set the whole original image as one target region. The calculation unit 11 has a predetermined work threshold $\xi_{th}$ for sorting into patches with a high texture strength and patches with a low texture strength. Then, the calculation unit 11 obtains the number of patches Nc where the texture strength $\xi$ is equal to or higher than the threshold $\xi_{th}$ among a plurality of patches obtained from the original image. The calculation unit 11 then divides the value Nc by the total number of patches N and thereby obtains the degree of complexity R of the target region. This is represented by the equation R=Nc/N.

Alternatively, the calculation unit 11 may obtain the overall degree of complexity R by the following equation (6).

$$R \left( \sum_i^{Nc} \xi_i / Nc \right) / \xi_{max} \quad (6)$$

where Nc is the number of patches where the texture strength $\xi$ is equal to or higher than the work threshold $\xi_{th}$ among a plurality of patches obtained from the original image. $\xi_{max}$ is a predetermined maximum value of the texture strength. The equation (6) indicates that the degree of complexity of the target region is obtained by dividing the average value of the texture strengths of the patches where the texture strength is equal to or higher than a specified value in the target region by the predetermined maximum value of the texture strength.

In the above method, the texture strength is calculated for each small patch of 7×7 pixels, and then the degree of complexity of the whole image is calculated. Another possible method is to calculate the texture strength of the whole image by applying the above-described processing of calculating the texture strength to the whole image. However, in this case, the effect of a local edge is ignored, dominated by the strength of a large edge in the whole image. To avoid this, by dividing the image into patches, calculating the texture strength for each patch and then calculating the degree of complexity of the whole image by using the texture strength, it is possible to accurately calculate the degree of complexity of the whole image.

[Method of setting a plurality of target regions] The calculation unit 11 may set a plurality of target regions by dividing the original image and calculate the degree of complexity R for each target region.

The method of dividing the original image is not limited. For example, the calculation unit 11 may evenly divide the original image into a predetermined number of parts (for example, eight equal parts, sixteen equal parts etc.). Then, the calculation unit 11 obtains the degree of complexity R for each target region by the same way as in the case of applying one degree of complexity R to the whole original image.

Alternatively, the calculation unit 11 may divide the original image dynamically by grouping a plurality of patches whose texture strength is within a specified range and which are arranged continuously together based on the position and the texture strength of each patch. Then, the calculation unit 11 obtains the degree of complexity R for each target region by the same way as in the case of applying one degree of complexity R to the whole original image. In this manner, the calculation unit 11 may group a plurality of patches in a cluster based on the texture strength and thereby divide the image into a region with a high texture strength and a high degree of complexity and a region with a low texture strength and a low degree of complexity.

[Use of a different edge threshold for each patch] The calculation unit 11 may set the degree of complexity R for each patch. In this case, the calculation unit 11 calculates the degree of complexity R by the following equation (7) based on a predetermined maximum value $\xi_{max}$ of a texture strength and the texture strength $\xi$ of a patch.

$$R = \xi/\xi_{max} \quad (7)$$

In this manner, the calculation unit 11 calculates the degree of complexity R based on the texture strength $\xi$. By this calculation, the degree of positional dispersion of edges is obtained in the target region. Because the degree of complexity R is higher as the texture strength $\xi$ is higher, the texture strength $\xi$ can be regarded as one type of the degree of complexity.

After calculating the degree of complexity R for one target region or each of a plurality of target regions, the calculation unit 11 generates information about the target region and outputs it to the setting unit 12. Each record of target region information is data in which an identifier that uniquely identifies a target region, the position or range of the target region, and the degree of complexity R set for the target region are associated with one another.

The setting unit 12 is a functional element that sets an edge threshold to be used for detection of a text region from a target region. The setting unit 12 has a reference value (reference threshold) $TH_{org}$ of an edge threshold in advance. The setting unit 12 multiplies the reference value $TH_{org}$ by the degree of complexity R of a target region and thereby obtains the final edge threshold TH to be used for the target region. Then, the setting unit 12 sets the edge threshold TH as a part of information of the target region.

Because the edge threshold is obtained by $TH = TH_{org} \times R$, the edge threshold of a target region increases linearly with respect to the degree of complexity in this embodiment. However, because it is only necessary to set an edge threshold in such a way that the edge threshold increases as the degree of complexity of a target region is higher, the relational expression between the edge threshold and the degree of complexity is not limited. The setting unit 12 may calculate the final edge threshold from the degree of complexity by using a calculation method other than the simple multiplication. For example, the setting unit 12 may increase the edge threshold nonlinearly with respect to the degree of complexity.

In the case where a plurality of target regions are set, the setting unit 12 sets the edge threshold TH for each target region and adds the edge threshold TH to each target region information. The setting unit 12 outputs the target region information to which the edge threshold has been added, to the detection unit 13.

The detection unit 13 is a functional element that detects the edge of a text region from a target region by using a set edge threshold. For example, the detection unit 13 can detect the edge by using the Canny method. Because the Canny method uses two thresholds, the detection unit 13 uses a set edge threshold as a first threshold, and uses another value that is set based on the edge threshold as a second threshold. For example, the detection unit 13 uses a value that is twice the edge threshold as the second threshold. The edge detection that is suitable for the whole part or each divided region of the original image is thereby achieved as shown in FIG. 3. As a matter of course, a method of detecting a text region is not limited to the Canny method, and the detection unit 13 may detect a text region using any method.

Figure 9:
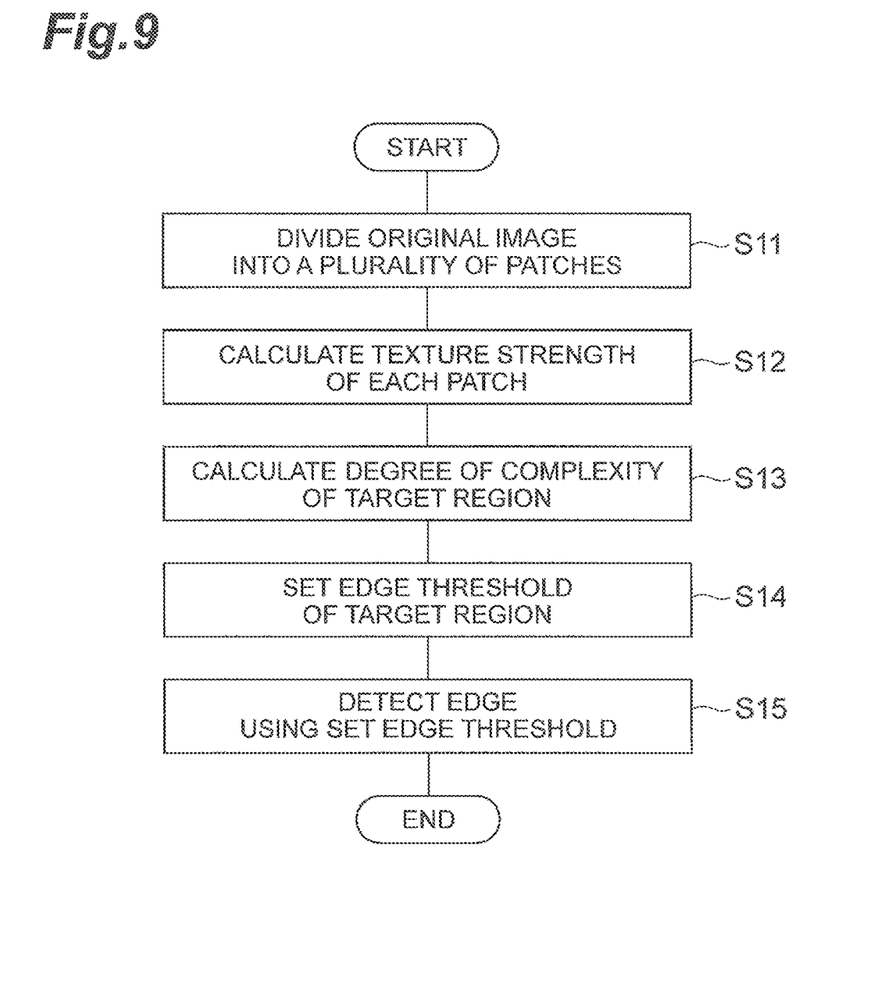
FIG. 9 is a flowchart showing an operation of the image processing device according to the embodiment.

The operation of the image processing device 10 is described, and further an image processing method according to this embodiment is described hereinafter with reference to FIG. 9.

First, the calculation unit 11 divides the original image into a plurality of patches (Step S11), and calculates the texture strength of each patch (Step S12, calculation step). Next, the calculation unit 11 calculates the degree of complexity of one or a plurality of target regions based on the texture strength (Step S13, calculation step). Then, the setting unit 12 sets the edge threshold of the target region by using the degree of complexity (Step S14, setting step). After that, the detection unit 13 detects the edge of the text region by using the edge threshold (Step S15).

Figure 10:
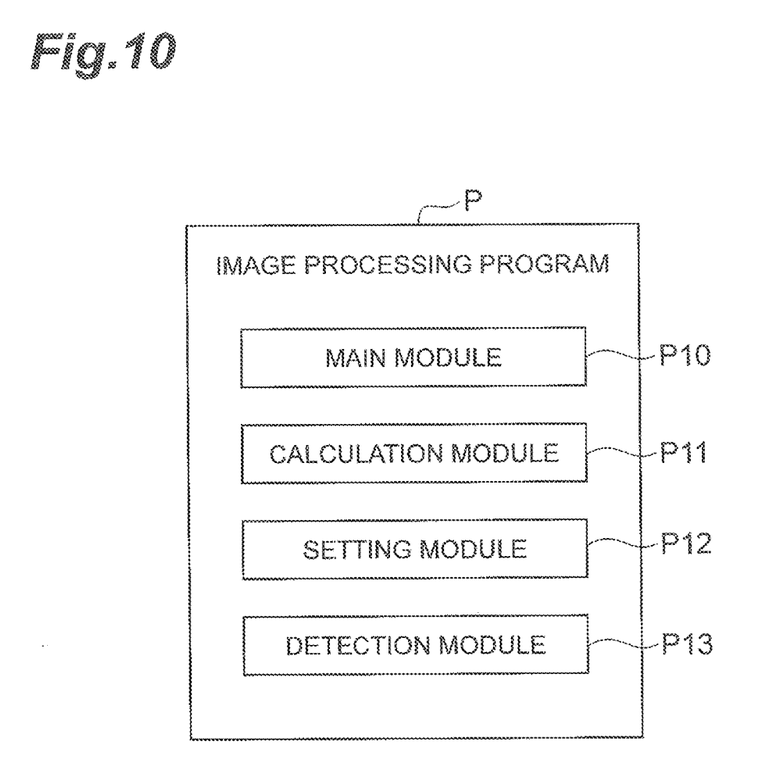
FIG. 10 is a view showing a configuration of an image processing program according to the embodiment.

An image processing program P for implementing the image processing device 10 is described hereinafter with reference to FIG. 10.

The image processing program P includes a main module P10, a calculation module P11, a setting module P12, and a detection module P13.

The main module P10 is a part that exercises control over the image processing function. The functions implemented by executing the calculation module P11, the setting module P12 and the detection module P13 are equal to the functions of the calculation unit 11, the setting unit 12 and the detection unit 13 described above, respectively.

The image processing program P may be provided in the form of being recorded in a static manner on a tangible recording medium such as CD-ROM or DVD-ROM or semiconductor memory, for example. Further, the image processing program P may be provided as a data signal superimposed onto a carrier wave through a communication network.

As described above, according to this embodiment, the degree of complexity indicating the degree of positional dispersion of edges is calculated for a target region, and the edge threshold is set to a lower value as the degree of complexity is lower. In this manner, by setting the edge threshold dynamically according to the degree of complexity, it is possible to detect the edge in accordance with the characteristics (for example, the texture strength) of a target region and thereby detect a text region more reliably.

In the case where text is inserted into an image in such a way that it cannot be extracted by uniform text extraction processing, there is a tendency that the contrast of text is set to low to the extent that it is visible to human eyes (for example, translucent text) so that the text does not stand out too much. Thus, by setting a threshold according to the degree of complexity of the image, it is possible to extract the edge of text, avoiding the detection of an unnecessary edge other than text.

There is a case where text with low contrast with a background region is inserted into an image in order to prevent that text such as advertisement inserted into an image is detected by mechanical text detection processing. As a result of detailed analysis by the present inventors, it is found that text with relatively high contrast is inserted into an image with a high degree of complexity, and text with relatively low contrast is inserted into an image with a low degree of complexity. The degree of complexity indicates the degree of positional dispersion of edges over an image region. The image with a high degree of complexity is a lawn region in the image Ga or a patch Bx, for example, In the case of inserting text such as advertisement into an image with a relatively high degree of complexity, it is considered that text with relatively high contrast is inserted so that it is recognizable by human eyes. On the other hand, while human can read text with relatively low contrast that is inserted into an image with a relatively low degree of complexity, if text with high contrast is inserted into such an image, it is likely to be detected. Therefore, it is considered that text with relatively low contrast is inserted into an image with a relatively low degree of complexity.

Thus, by setting a threshold for edge detection to a lower value as the degree of complexity of an image region where an edge is to be detected is lower, it is possible to appropriately set the threshold for edge detection in accordance with the contrast between an inserted text region and a background region.

If one degree of complexity is set for the whole original image, it is only necessary to use one edge threshold for detection of a text region, which makes processing easy. On the other hand, if an image region is divided into a plurality of regions and an edge threshold is set for each region, it is possible to perform edge detection that is suitable for the characteristics of each of the divided regions.

An embodiment of the present invention is described in detail above. However, the present invention is not limited to the above-described embodiment. Various changes and modifications may be made to the present invention without departing from the scope of the invention.

Although the calculation unit 11 uses eigen decomposition in the above-described embodiment, a technique to be used for calculation of the texture strength is not limited. The calculation unit 11 may calculate the texture strength by using another technique such as principal component analysis or frequency analysis.

REFERENCE SIGNS LIST

10 . . . image processing device, 11 . . . calculation unit, 12 . . . setting unit, 13 . . . detection unit, P . . . image processing program, P10 main module, P11 . . . calculation module, P12 . . . setting module, P13 . . . detection module

The invention claimed is:

1. An image processing device comprising:
at least one memory operable to store computer program instructions;
at least one processor operable to access said at least one memory, read said program instructions and operate according to said program instructions, said program instructions including:
calculation instructions configured to cause at least one of said at least one processor to calculate a degree of complexity indicating a degree of positional dispersion of edges in a target region where a text region is to be extracted, based on a texture strength indicating a degree of change in pixel value in the target region; and
setting instructions configured to cause at least one of said at least one processor to set an edge threshold for detecting the text region in the target region, the edge threshold being set lower as the degree of complexity is lower, wherein
the calculation instructions are further configured to cause at least one of the at least one processor to:
divide an original image into a plurality of patches;
calculate the texture strength for each patch; and
calculate the degree of complexity of the target region composed of one or more patches based on one or more patches where the texture strength is equal to or higher than a predetermined threshold in the target region.

2. The image processing device according to claim 1, wherein the target region is the whole of the original image.

3. The image processing device according to claim 1, wherein the calculation instructions are further configured to cause at least one of said at least one processor to group a plurality of patches having the texture strength within a specified range and arranged continuously together, set each group as the target region, and calculate the degree of complexity of each target region.

4. The image processing device according to claim 1, wherein the calculation instructions are further configured to cause at least one of said at least one processor to evenly divide the original image to generate a plurality of divided regions including a plurality of patches, and calculate the degree of complexity of each divided region based on the degree of complexity of each patch.

5. The image processing device according to claim 1, wherein the calculation instructions are further configured to cause at least one of said at least one processor to obtain the degree of complexity of the target region by dividing the number of patches where the texture strength is equal to or higher than a specified value in the target region by the total number of patches in the target region.

6. The image processing device according to claim 1, wherein the calculation instructions are further configured to cause at least one of said at least one processor to obtain the degree of complexity of the target region by dividing an average value of the texture strengths of the plurality of patches where the texture strength is equal to or higher than a specified value in the target region by a predetermined maximum value of the texture strength.

7. An image processing method performed by an image processing device, comprising:
calculating a degree of complexity indicating a degree of positional dispersion of edges in a target region where a text region is to be extracted, based on a texture strength indicating a degree of change in pixel value in the target region; and setting an edge threshold for detecting the text region in the target region, the edge threshold being set lower as the degree of complexity is lower, wherein
the calculating comprises:
dividing an original image into a plurality of patches;
calculating the texture strength for each patch; and
calculating the degree of complexity of the target region composed of one or more patches base on one or more patches where the texture strength is equal to or higher than a predetermined threshold in the target region.

8. A non-transitory computer-readable recording medium storing an image processing program causing a computer to execute a method comprising:
calculating a degree of complexity indicating a degree of positional dispersion of edges in a target region where a text region is to be extracted, based on a texture strength indicating a degree of change in pixel value in the target region; and
setting an edge threshold for detecting the text region in the target region, the edge threshold being set lower as the degree of complexity is lower, wherein
the calculating comprises:
dividing an original image into a plurality of patches;
calculating the texture strength for each patch; and
calculating the degree of complexity of the target region composed of one or more patches based on one or more patches where the texture strength is equal to or higher than a predetermined threshold in the target region.

9. An image processing device comprising:
at least one memory operable to store computer program instructions;
at least one processor operable to access the at least one memory, read the program instructions and operate according to the program instructions, the program instructions including:
calculation instructions configured to cause at least one of the at least one processor to calculate a degree of complexity indicating a degree of positional dispersion of edges in a target region where a text region is to be extracted, based on a texture strength indicating a degree of change in pixel value in the target region; and
setting instructions configured to cause at least one of the at least one processor to set an edge threshold for detecting the text region in the target region, the edge threshold being set lower as the degree of complexity is lower, wherein
the calculation instructions are further configured to cause at least one of the at least one processor to:
divide an original image into a plurality of patches:
calculate the texture strength for each patch; and
calculate, for each patch, the degree of complexity of the patch by dividing the texture strength in the patch by a predetermined maximum value of the texture strength.

10. An image processing method performed by an image processing device, comprising:
calculating a degree of complexity indicating a degree of positional dispersion of edges in a target region where a text region is to be extracted, based on a texture strength indicating a degree of change in pixel value in the target region; and
setting an edge threshold for detecting the text region in the target region, the edge threshold being set lower as the degree of complexity is lower, wherein
the calculating comprises:
dividing an original image into a plurality of patches;
calculating the texture strength for each patch; and
calculating, for each patch, the degree of complexity of the patch by dividing the texture strength in the patch by a predetermined maximum value of the texture strength.

11. A non-transitory computer-readable recording medium storing an image processing program causing a computer to execute a method comprising:
calculating a degree of complexity indicating a degree of positional dispersion of edges in a target region where a text region is to be extracted, based on a texture strength indicating a degree of change in pixel value in the target region; and
setting an edge threshold for detecting the text region in the target region, the edge threshold being set lower as the degree of complexity is lower, wherein
the calculating comprises:
dividing an original image into a plurality of patches;
calculating the texture strength for each patch; and
calculating, for each patch, the degree of complexity of the patch by dividing the texture strength in the patch by a predetermined maximum value of the texture strength.

* * * * *